US011556180B2

(12) United States Patent
Giraud et al.

(10) Patent No.: US 11,556,180 B2
(45) Date of Patent: Jan. 17, 2023

(54) INDIVIDUAL SENSOR-ACTUATOR FOR GENERATING A HAPTIC EFFECT ON A PANEL, AND USE OF SAME

(71) Applicants: HAP2U, Saint Martin d'Hères (FR); Université de Lille, Lille (FR)

(72) Inventors: Frederic Giraud, Marcq en Baroeul (FR); Christophe Giraud-Audine, Lambersart (FR); Michel Amberg, Villeneuve d'Ascq (FR); Betty Lemaire-Semail, Lille (FR); Bruno Challiol, Saint Egreve (FR)

(73) Assignees: HAP2U, Saint Martin d'Héres (FR); UNIVERSITÉ DE LILLE, Lille (FR)

( * ) Notice: Subject to any disclaimer, the term of this patent is extended or adjusted under 35 U.S.C. 154(b) by 0 days.

(21) Appl. No.: 17/434,229

(22) PCT Filed: Feb. 27, 2020

(86) PCT No.: PCT/FR2020/000048
§ 371 (c)(1),
(2) Date: Aug. 26, 2021

(87) PCT Pub. No.: WO2020/174134
PCT Pub. Date: Sep. 3, 2020

(65) Prior Publication Data
US 2022/0137706 A1  May 5, 2022

(30) Foreign Application Priority Data

Feb. 27, 2019 (FR) ...................................... 1901994

(51) Int. Cl.
*G06F 3/041* (2006.01)
*G06F 3/01* (2006.01)
(Continued)

(52) U.S. Cl.
CPC ............ *G06F 3/016* (2013.01); *B06B 1/0276* (2013.01); *B06B 1/0622* (2013.01);
(Continued)

(58) Field of Classification Search
None
See application file for complete search history.

(56) References Cited

U.S. PATENT DOCUMENTS

2010/0156818 A1   6/2010  Burrough et al.
2017/0205883 A1*  7/2017  Tanaka .................... G06F 3/041
(Continued)

FOREIGN PATENT DOCUMENTS

FR    3066841 A1    11/2018
WO    2009120926 A1  10/2009

OTHER PUBLICATIONS

International Preliminary Report on Patentability issued in corresponding International Patent Application No. PCT/FR2020/000048 dated Jun. 11, 2021.
(Continued)

*Primary Examiner* — Carl Adams
(74) *Attorney, Agent, or Firm* — Buchanan Ingersoll & Rooney PC

(57) ABSTRACT

A system includes sensor-actuator units fixed onto a plate to be actuated according to at least one predetermined vibratory mode, each sensor-actuator unit having an electromechanical actuator and a deformation or vibratory speed sensor, wherein the electromechanical actuator and the sensor are colocated on the surface, that is to say that the measurement by the sensor is performed in immediate proximity to the electromechanical actuator, this proximity being such that the actuator and the sensor can respectively actuate and measure the same predetermined vibratory mode.

15 Claims, 3 Drawing Sheets

(51) Int. Cl.
     *B06B 1/02*      (2006.01)
     *B06B 1/06*      (2006.01)
(52) U.S. Cl.
     CPC ....... *B06B 2201/55* (2013.01); *B06B 2201/70* (2013.01); *G06F 3/041* (2013.01)

(56) References Cited

U.S. PATENT DOCUMENTS

2018/0059857 A1* 3/2018 Kumada ............... G06F 3/0234
2020/0179978 A1  6/2020 Vezzoli et al.
2020/0253294 A1* 8/2020 Van de Zande ........ G06F 3/016

OTHER PUBLICATIONS

International Search Report (PCT/ISA/210) with translation and Written Opinion (PCT/ISA/237) dated Jul. 24, 2020, by the European Patent Office as the International Searching Authority for International Application No. PCT/FR2020/000048.

Ghenna, Sofiane, et al., "Preliminary design of a multi-touch ultrasonic tactile stimulator", World Haptics Conference (WHC), 2015 IEEE, Jun. 2015, https://halinria.fr/hal-01238296 (7 pages).

Ghenna, Sofiane, et al., "Vector Control of Piezoelectric Transducers and Ultrasonic Actuators", IEEE Transactions on Industrial Electronics, Jun. 1, 2018, vol. No. 6, pp. 4880-4888 (9 pages).

* cited by examiner

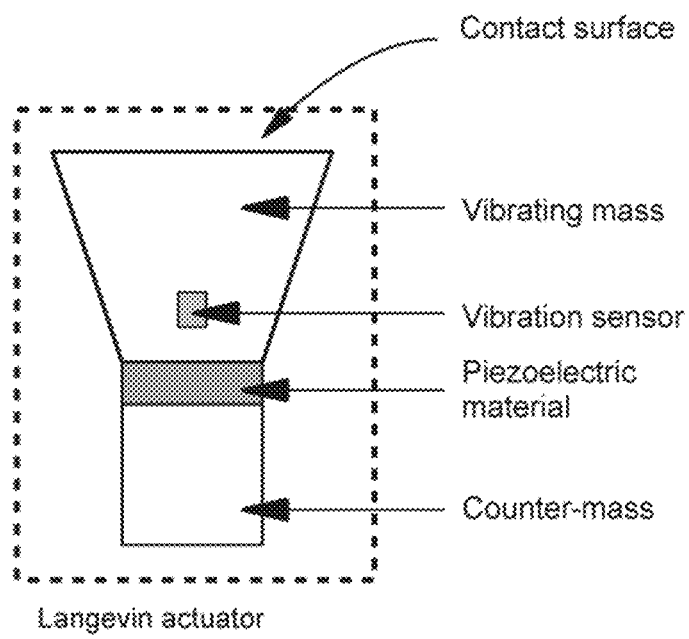
[Fig 1]
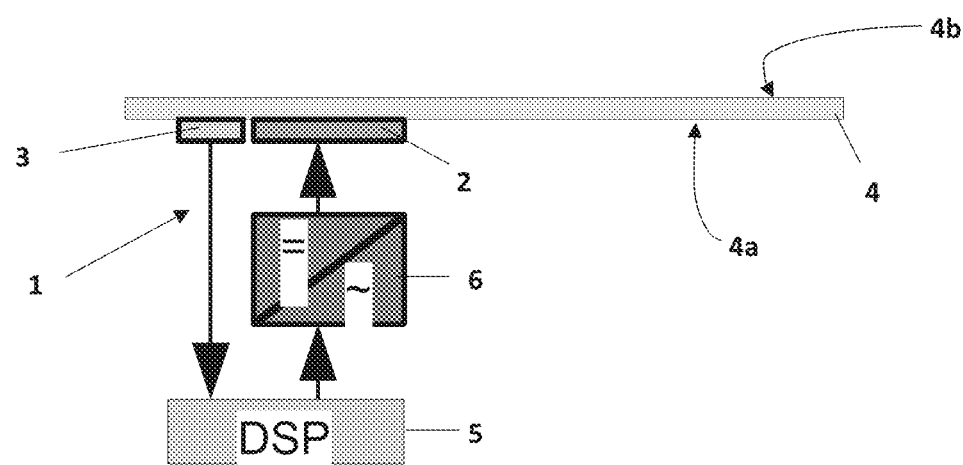
[Fig 2]

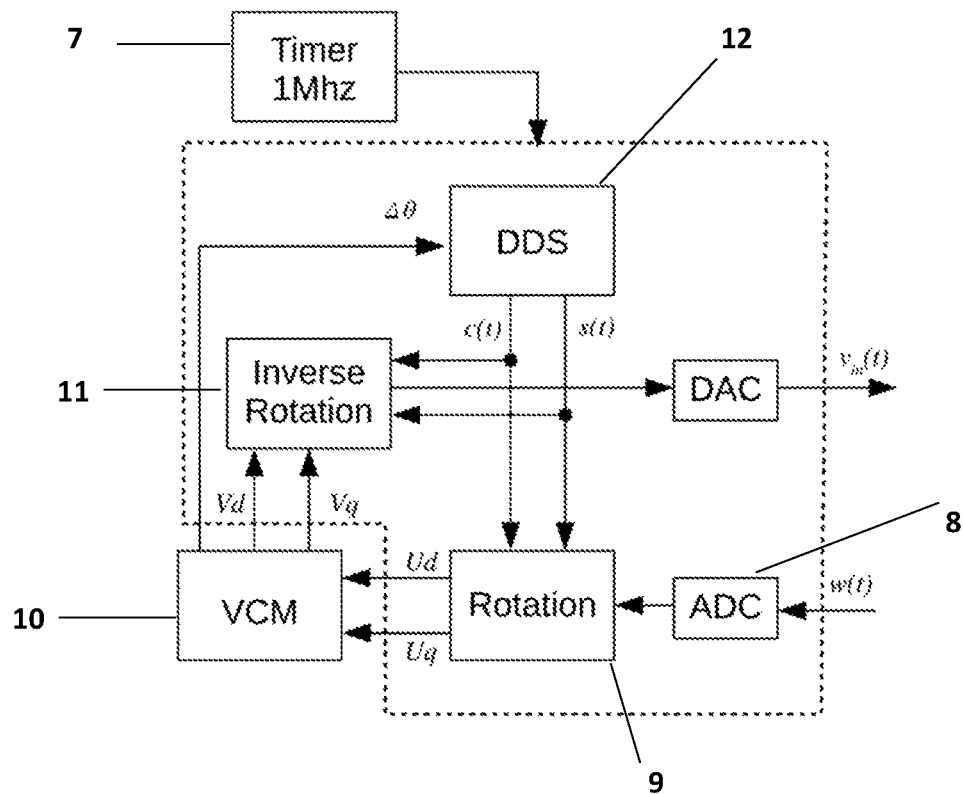
[Fig 3]
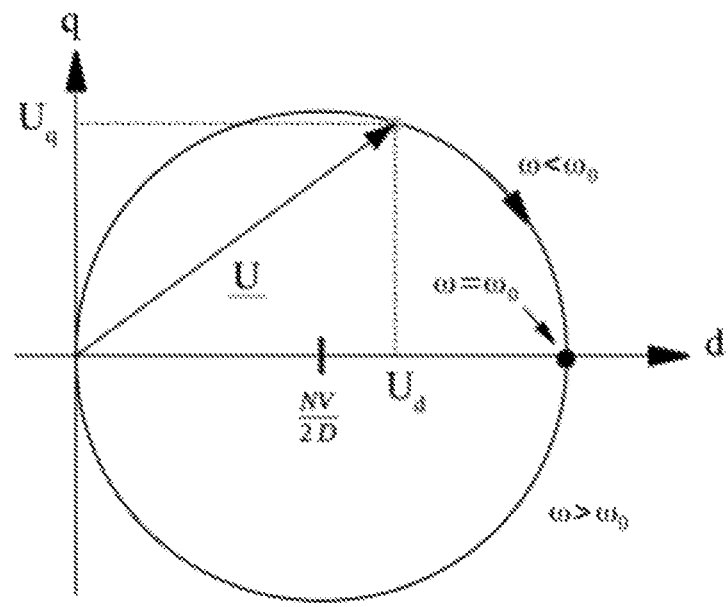
[Fig 4]

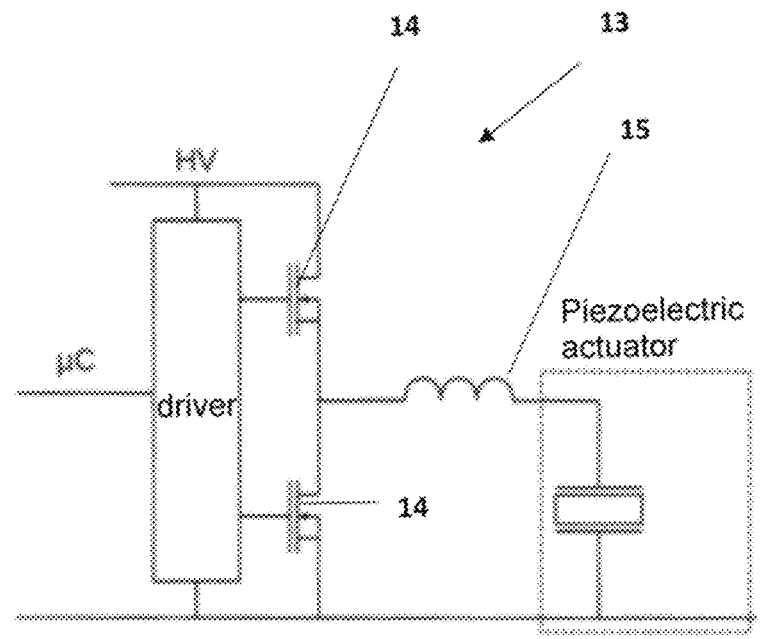
[Fig 5]
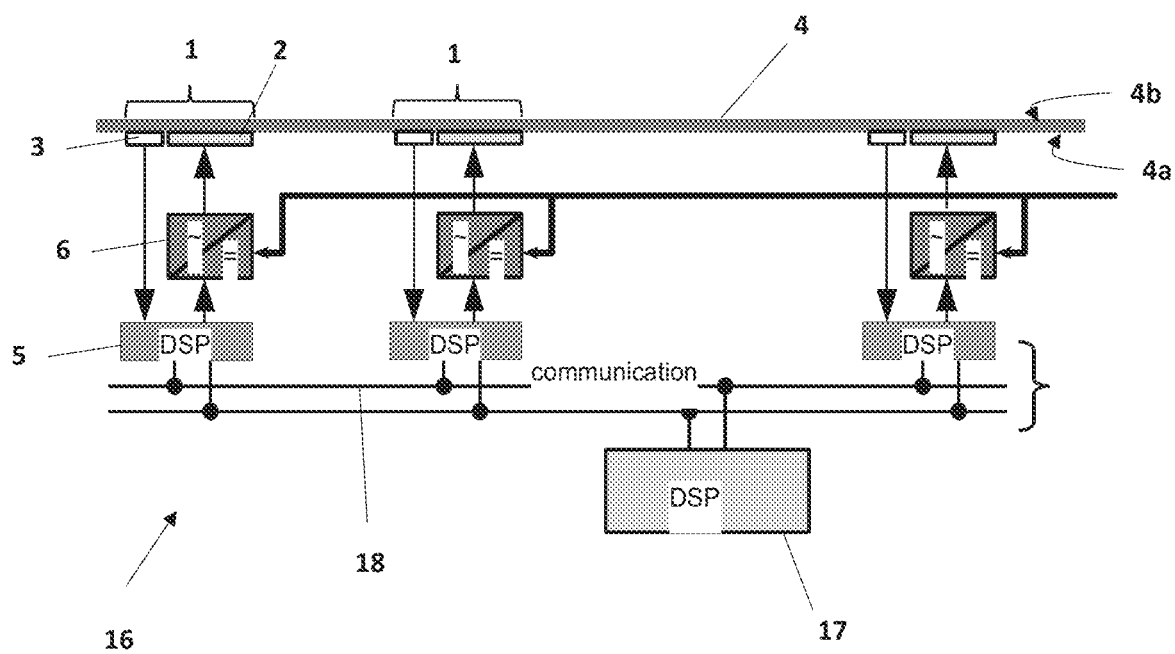
[Fig 6]

INDIVIDUAL SENSOR-ACTUATOR FOR GENERATING A HAPTIC EFFECT ON A PANEL, AND USE OF SAME

The present invention relates to the field of the touch interfaces that use multiple electromechanical actuators, notably piezoelectric actuators, distributed over the interface.

STATE OF THE ART

The known touch interfaces which use multiple actuators, notably piezoelectric actuators, pose several problems associated with their actuator power supply and control architecture, with the existence of crosstalk phenomena between the actuators, or even with an excessive sensitivity to the environmental conditions.

With respect to the power supply, each piezoelectric actuator has to be supplied with electrical energy to be able to transform it into a deformation through the piezoelectric effect. The energy must therefore be distributed in a complex way over all of the vibrating structure, which creates complexity in the actuator power supply architecture.

In some known configurations, different actuators are supplied in parallel. They are then supplied by the same electrical voltage, but that does not guarantee the synchronization of the movements of the actuators, and therefore the correct coordination of the actions on the touch interface, because each actuator can have its own resonance frequency.

With respect to the control of the actuators, the actions of the different actuators must be well coordinated in order to produce a good tough sensation for a user, which creates complexity in the actuator control architecture.

In some known configurations, each actuator has its own amplifier and the voltage reference comes from a single computer. This method allows the actions to be synchronized via this single computer. On the other hand, it is complex to implement because the single computer must include multiple outputs.

To synchronize the actuators, an inverse filtering is used: the transfer functions of each amplifier and of the vibrating structure are identified, then inverted to obtain the voltage references as a function of a reference deformation. However, since these transfer functions vary with the experimental conditions (geometrical variations, temperature, pressure of the finger of the user, etc.) they have to be regularly identified.

In the article (1) by Sofiane Ghenna, Frédéric Giraud, Christophe Giraud-Audine, Michel Amberg, Betty Lemaire-Semail intitled "Preliminary design of a multi-touch ultrasonic tactile stimulator", published in "World Haptics Conference (WHC), 2015 IEEE, June 2015, Chicago, United States, 10.1109/WHC.2015.7177687 <hal-01238296>" an embodiment of a beam with two vibration modes controlled by two actuators is presented, but, in this implementation, the control of the actuators is not distributed at the actuator level. Instead, a single controller manages the voltage references in closed loop mode. This presents the drawback of requiring consequential connection technology between the actuators and the single controller (DSP) for the signal and the power of the actuators. To accommodate multiple resonance modes, the single controller then needs multiple inputs for the measurement of the deformations, and multiple outputs for the power supply voltages. The single controller must therefore include a large number of inputs/outputs, which makes it complex and costly.

In the article (2) "Vector Control of Piezoelectric Transducers and Ultrasonic Actuators" de Sofiane Ghenna, Frédéric Giraud, Christophe Giraud-Audine, Michel Amberg dans «IEEE Transactions on Industrial Electronics 2018», an experimental device is described for the low-level control of a Langevin actuator in the ultrasonic range. This control makes it possible to follow a reference in terms of deformation amplitude and to have the resonance frequency of the actuator followed, but it is described only for a single vibration mode of a single actuator as such, and it is not therefore suited to the control of different vibratory modes of a touch interface such as a plate provided with a plurality of actuators. Consequently, to accommodate multiple vibration resonance modes of a plate, it would be necessary to implement several control loops operating in parallel. Furthermore, the controller must, in this case, be a very fast, and costly controller.

Moreover, in the known architectures with distributed multiple actuators, the distribution of the power supply to the different actuators is often at high voltage, and therefore risks generating a crosstalk phenomenon, that is to say that the power supply of one actuator can disturb the power supply of the neighboring actuators, and the overall vibratory effect is thereby disturbed. It can also disturb the vibration measurements, and therefore the power supply voltage of an actuator can end up in the vibration measurement of a sensor of the system.

Finally, the known architectures with multiple actuators are often very sensitive to changes in environmental conditions, such as the operating temperature, and the touch effect obtained using actuators can thereby be disturbed.

AIM OF THE INVENTION

The general aim of the invention is to propose a new type of sensor-actuator for ultrasonic applications, one that makes it possible to solve the abovementioned problems and the drawbacks of the known systems with multiple actuators.

The particular aim of the invention is to propose a system using sensor-actuator pairs, in which the conversion of energy (that is to say the power supply of the actuators) is performed at the level of each sensor, so that the energy and not the voltage is distributed to each actuator, in order to generate less crosstalk between actuators.

Another particular aim of the invention is to propose a system having multiple sensor-actuators to which the vibratory references are supplied by a communication link from a master microcontroller, and at a reduced frequency.

SUMMARY OF THE INVENTION

In principle, the present invention proposes a distributed and hierarchical vibration control structure including a master and a set of slaves. A slave is a sensor-actuator unit pairing in which the sensor and the actuator are colocated, that is to say ideally located at the same point of a plate to be actuated, or at least at a very small distance from one another on the plate. Its role is to locally control the vibration of the plate. The sensor-actuator pairing includes a DC-AC converter to power the actuator by amplifying the signals of the control circuit making use of the sensor measurements. The aim is locally and rapidly to follow the setpoints which are assigned to it by the master processor.

A slave is therefore a system of sensor-actuators incorporating:

the voltage references for the DC/AC converter the sensors for measuring the vibration of the actuators
a control algorithm which integrates the control of the actuators in a revolving reference frame
a communication module that is as fast as possible.

The "master" controller or processor sends the local vibratory references of the plate to each sensor-actuator, determined from the reference to be implemented globally. It receives quantities (measurements, voltages) from the sensor-actuator units. By aggregating this information, the master has global information and can adjust the references transmitted to each of the slaves.

The subject of the invention is therefore a system having a plurality of sensor-actuator units fixed onto a first face of a plate to be actuated according to at least one predefined vibratory mode, namely a single vibratory mode in which all the sensor-actuators are driven at the same frequency, or a multiple vibratory mode in which the sensor-actuators are driven at different frequencies, each sensor-actuator unit having an electromechanical actuator and a deformation or vibratory speed sensor both fixed onto said first face of the plate so as to create, on a second face of the plate opposite said first face, a vibration generating a haptic effect that can be felt by a finger or a stylus of a user, characterized in that the actuator and the sensor of each sensor-actuator unit are fixed side-by-side on said first face of the plate so that the actuator and the sensor of each sensor-actuator can respectively actuate and measure one and the same predetermined vibratory mode of the plate.

In this way, a situation in which a given sensor-actuator can measure vibratory modes that it is not capable of actuating is avoided.

According to one embodiment, corresponding to operation with multiple vibratory modes of the plate, the distance between the sensor and the actuator of each sensor-actuator unit is less than or equal to half the wavelength of the vibration at the lowest resonance frequency at which the actuator must actuate said plate, out of the resonance frequencies of the actuators of the system.

According to another embodiment corresponding to operation with a single vibratory mode, the distance between the sensor and the actuator of each sensor-actuator unit on said first face is equal to a multiple of half the wavelength of the vibration corresponding to the single actuation frequency of the actuators.

According to an advantageous embodiment, the electromechanical actuator is a piezoelectric actuator.

Preferably, the maximum size of the actuator (namely its length in the case of a rectangular actuator) is between 2 and 25 mm, so as to ensure the actuation function while being small enough to be able to excite the vibratory modes of the smallest wavelengths in an ultrasonic vibratory frequency range lying between 20 kHz and 200 kHz.

According to one embodiment, the sensor is arranged to supply a measurement signal w(t) to a processor associated with the sensor-actuator, and said processor is arranged to calculate the instantaneous value denoted $V_{in}(t)$ of the power supply voltage to be delivered to the actuator.

According to the invention, the sensor-actuator includes a DC-to-AC voltage converter controlled by the processor associated with the sensor-actuator.

According to an advantageous embodiment of the invention, the value of the power supply voltage $V_{in}(t)$ is servo-controlled by a digital controller on the instantaneous value of the measurement signal w(t) delivered by the sensor.

According to one embodiment, the system according to the invention includes a master processor connected in parallel to an input of each of the slave processors of the sensor-actuator units, so as to be able to dissociate the control signals of the different actuators.

According to an advantageous embodiment, the master processor is configured to send each slave processor synchronization information at a frequency lower than the vibration frequency of the sensors.

According to one embodiment of the invention, the master processor is configured to execute, during an initialization phase, a self-addressing algorithm so as to automatically establish the mapping of the network of sensor-actuators on the plate to be actuated.

According to one embodiment, the master processor is configured to transmit to the slave processors working parameters, namely the data necessary to the control of one or more vibratory modes of the plate to be actuated. It can also be configured to transmit to the slave processors voltage setpoint values for each vibratory mode, as a function of the spatial distribution of the sensor-actuators, of the resonance frequencies assigned to the different sensor-actuators during the initialization phase, and as a function of the effect sought for a user on a touch face of the plate to be actuated.

According to one embodiment, the master processor is configured to, during a diagnostic phase, interrogate the slave processors to obtain their operating parameters and to rectify the parameterization of the individual sensor-actuators if necessary.

Finally, according to an advantageous embodiment, the master processor is configured to, during an interfacing phase, communicate to an external processing device the data collected from the slave processors in order to allow the post-processing thereof.

DETAILED DESCRIPTION

The invention will be described in more detail with reference to the attached figures in which:

FIG. 1 represents a simplified diagram of an experimental device from the same inventors, described in document (2) of the prior art cited above;

FIG. 2 represents a diagram of the architecture of a sensor-actuator unit assembly of the system according to the invention;

FIG. 3 represents the internal diagram of the processor which controls each sensor-actuator;

FIG. 4 represents the principle of the control of the vibration using a revolving reference frame;

FIG. 5 represents the electrical power supply circuit of different piezoelectric actuators;

FIG. 6 represents a diagram of the architecture of a plurality of sensor-actuators of the system according to the invention for actuating a touch interface.

Reference is made to FIG. 1 schematically illustrating the experimental device known from the document (2) cited above and using a single actuator of Langevin type, consisting of a piezoelectric pad inserted between a vibrating mass provided with a textured top surface, and a counter-mass. A piezoelectric vibration sensor is fixed directly onto the Langevin actuator, namely onto its vibrating mass, and not onto a plate bearing an actuator of Langevin type. A user can test the touch effect generated directly on the actuator by resting a finger on the textured top surface of its vibrating mass. This document does not give any indication on the use of actuators and of multiple sensors colocated on a face of a plate and arranged very close in such a way that the colocated actuators and sensors can respectively actuate and measure the same predetermined vibratory mode of the plate which bears them.

Refer now to FIG. 2 representing the theoretical diagram of a system with sensor-actuator unit 1 according to the invention. A sensor-actuator 1 includes an electromechanical actuator 2 (of piezoelectric or electromechanical or other type) and a deformation or vibratory speed sensor 3 (of the same type as the examples cited above for example) both fixed onto said first face 4a of the plate 4 so as to create, on a second face 4b of the plate 4 opposite said first face 4a, a vibration generating a haptic effect that can be felt by a finger or a stylus of a user placed on the second face 4b of the plate.

According to the invention, the actuator 2 and the sensor 3 are colocated on a face 4a of a vibrating plate 4, that is to say that the measurement by the sensor 3 is very close to the point where the actuation is applied by the actuator 2. "Plate" in the context of the present invention is understood to mean a sheet of any, rigid, solid, material of small thickness compared to its other dimensions.

Preferably, in the case of a multiple vibratory mode, in which multiple actuators are driven at different actuation frequencies, the distance between the sensor 3 and the actuator 2 of each sensor-actuator unit 1 is less than half a wavelength of the vibration according to the lowest resonance frequency at which the actuators 2 must actuate said plate 4.

This sensor-actuator assembly 1 is attached to a vibrating structure, represented here in the form of a vibrating plate or slab 4. The fixing of the sensor 3 and of the actuator 2 onto a face 4a of the plate 4 is done, for example, by gluing. The size of the sensor-actuator assembly 1 has to be large enough to ensure the actuation and measurement functions, but small enough to be able to excite the vibratory modes of small wavelength. As an example, the maximum size of the actuator 2 (namely its length in the case of a rectangular actuator) is between 2 and 25 mm, so as to ensure the actuation function while being small enough to be able to excite the vibratory modes of high frequency and therefore of small wavelength. Typically, it is the actuation frequencies in an ultrasonic range lying between 20 kHz and 200 kHz that are of interest.

Each sensor-actuator 1 of the device is controlled by a digital signal processor 5 (also denoted DSP) which receives as input the signal from the sensor 3 and delivers as output a command signal to a DC-AC voltage converter 6 in order to locally servocontrol the vibratory amplitude on a setpoint value. In one implementation that is envisaged, it is possible to use a control of the vibration in a revolving reference frame, as is explained in the article (2) cited above.

Ideally, the processor DSP 5 and the voltage converter 6 are also very close to the sensor 3 and the actuator 2. But, in reality, they must be at a certain distance because they must not hamper the vibration of the vibrating plate 4.

Reference is now made to FIG. 3 which represents the internal diagram of the DSP processor 5 which controls each of the sensor-actuators 1. The dotted line block represents a working loop with high frequency, for example the frequency of 1 Mhz given by a clock 7. The rest of the blocks work at lower frequency.

W(t) is the measurement from the sensor 3. This is an a priori sinusoidal alternating voltage which can be analogous to the vibratory speed or to the displacement of the surface 4 in the vicinity of the actuator 2. The output voltage intended to be delivered to a sensor-actuator 1 is denoted $v_{in}(t)$. It is also sinusoidal alternating.

It is not easy to control a sinusoidal alternating quantity with high frequency, like w(t). This is why, after an analog/digital conversion stage by an analog/digital converter 8 (denoted ADC in FIG. 3), the measurement w(t) is first of all demodulated by a carrier with angular frequency ω (such demodulation is sometimes called rotation in the mechatronic systems). At the output of the demodulator 9, there are two quantities $U_d$ and $U_q$. In steady state operation, $U_d$ and $U_q$ are constant, which is why it is simpler to control $U_d$ and $U_q$ rather than directly control w(t). The demodulation stage 9 realizes:

$$U_d=(N/T)\int_{(NT)} w(t)\times\cos(\omega t)dt \text{ and } U_q=(N/T)\int_{(NT)} w(t)\times\sin(\omega t)dt \quad \text{[Math 1]}$$

in which T=2π/ω is the period of the vibration and N is an integer, which reflects the calculation horizon of $U_d$ and $U_q$.

The values of $U_d$ and $U_q$ are then compared, in a block 10 VCM (acronym for "Vector Control Method") to reference values $U_{dref}$ and $U_{qref}$, and correctors in the VCM block handle the servocontrolling of the voltage value by supplying power supply voltage $V_{in}(t)$ setting values, denoted $V_d$ and $V_q$.

The voltage setting values $V_d$ and $V_q$ are transmitted to a modulator 11 (also called inverse rotation). The voltage $V_{in}(t)$ is then calculated by:

$$V_{in}(t)=V_d \sin(\omega t)-V_q \cos(\omega t) \quad \text{[Math 2]}$$

Since the signals sin(ωt) and cos(ωt) are generated in one and the same microprocessor, the carrier of the demodulation is necessarily synchronous and has the same angular frequency as the vibration, since the latter is generated from the voltage v(t).

These signals cos(ωt) and sin(ωt) are generated from a direct synthesis DDS 12 (DDS being an acronym for "Direct Digital Synthesis"). In a block DDS, a timer generates a clock with fixed period $T_e$, much lower than the period of the controlled vibration mode (for example $T_e$=1 psec). On each clock step, a counter C of Nc bits (for example N=32) is incremented by a value denoted Δθ. At the end of a certain time, the counter will overrun. This time is calculated by: $T=(\Delta\theta/2^N) T_e$.

In principle, this time T will be equal to the vibration period of the mode considered, therefore of the resonance frequency considered.

In fact, the Ns most significant bits of the counter C serve as address for a ROM memory containing the values of the sine function. By shift, the cosine values are also found for the same instant. The changes of vibration frequency are made by modifying the value of Δθ.

In a certain mode of operation, called "resonance frequency following", it is sought to excite the vibratory mode precisely at the resonance frequency of the actuator, despite any variations in said frequency. The value of $V_q$ is systematically set at 0 by the block VCM. Then, the changing of $U_d$ and of $U_q$ when $V_d$ is fixed and ω (ω=2πf) is variable is done according to a particular circle, as represented in FIG. 4.

In fact, at the resonance frequency of the mode considered (ω=ω$_0$), $U_q$=0. Thus, it is not necessary to precisely know the value of the resonance frequency of the mode, since it is identified from the value of $U_q$. Then, a frequency following algorithm can be associated (it can be introduced into the VCM) in order to follow the resonance frequency.

In another mode of operation called "synchronous mode", the working frequency is imposed (for example, by a master processor as described later). Then, the value of $V_q$ is not zero, but a servocontrol loop of the block VCM is used to set $U_q$ to a particular value, for example 0.

Finally, each sensor-actuator 1 also has an electrical power supply 13, capable of amplifying the voltage $V_{in}$, while ensuring the impedance matching. For example, a bridge arm like that schematically represented in FIG. 5 can be used. A bus voltage denoted HV is chopped by the pulse width modulation method by two transistors 14. An inductor 15 filters the harmonic content while ensuring the alternation of the sources. For example, the piezoelectric actuator is capacitive. If it is connected to a voltage source, that generates enormous transient currents. To avoid that, it is arranged to insert a current source, in order to conform to the rule of alternation of the sources as known in power electronics. Possibly, a closed-loop control of the voltage can be implemented in the DSP processor 5 of each sensor-actuator unit 1.

FIG. 6 represents a diagram of a system 16 using a plurality of sensor-actuator units 1 as described previously, distributed on a plate 4 to be actuated, which, in practice, makes it possible to supply power to and control a set of electromechanical actuators distributed on a resonator, for example a touch interface in plate form 4.

The device 16 is hierarchical as represented in FIG. 6. It includes a main processor 17 which acts as master coordinating the processors 5 of the different sensor-actuator units 1 which act as slave processors. The master processor 17 has appropriate computation capabilities, but it is not necessarily very fast, and does not require dedicated peripheral devices. Its cost is thereby by limited. The number of the slave sensor-actuators 1 is variable. This number is determined by the user as a function of the plate 4 to be actuated and of the vibratory modes to be controlled.

The communication between the different elements is ensured via a networked communication 18 over one or two wires (of I2C or SPI type for example). The communication between the master processor 17 and the slave processors 5 can be relatively slow compared to a single-processor structure according to the state of the art. It is used for the less bandwidth-intensive administration operations such as the structuring of the network of sensor-actuators 1, the assignment of the slave processors 5, the transmission of the setpoint values, synchronization, system diagnostics, or the interfacing between external devices (not represented). These operations are described in more detail hereinbelow.

Structuring of the network: the master processor 17 executes a self-addressing algorithm by which it automatically establishes the mapping of the network of sensor-actuators 1.

Assignment of the slave processors 5: based on an a priori knowledge of the arrangement of the sensor-actuator units 1 on the structure 4 to be made to vibrate, the master processor 17 transmits to the slave processors 5 the working parameters (in concrete terms, the data necessary to the control of one or more vibratory modes, such as the resonance frequency or frequencies, the dampings, gains, parameters of the controller or controllers).

Definition and transmission of the setpoint values: by modal decomposition, the references for each mode are calculated as a function of the spatial distribution of displacement, speed or acceleration necessary to the effect sought on the surface 4 to be actuated (control of vibrations, focusing). The references, expressed in the revolving reference frame described above (FIG. 4), correspond to the envelopes of the real trajectories. On a given sensor-actuator 1, it or they will be modulated by the sensor-actuators as a function of the resonance frequencies which have been notified to them during the network initialization phase. This makes it possible to minimize the communication needs, because the number of points used to describe the envelope is less than that necessary to describe a signal modulated at ultrasound frequency. In fact, the envelope of a sinusoidal signal represents, for example, the trend of the peak amplitude over time. Since the trend of the amplitude is slower than the sinusoidal signal, it takes fewer points per second to describe it, than for the signal itself.

Synchronization: for applications of focused vibration type, the phase-shifts between the different modulations are critical. The master processor 17, once the slave processors 5 have been initialized, ensures the simultaneous triggering of the execution of the setpoints by a "word" transmitted over the communication travel.

Diagnostics: on interrogation from the master processor 17, a slave processor 5 reports to the master processor the elements that are necessary (voltages $V_d$, $V_q$, speed $U_d$ $U_q$ for example) to an operation diagnostic. On the basis of these data, the master processor 17 realigns the characteristics of the system based, for example, on an internal model of the structure. The realignment makes it possible to adjust the dynamic parameters and possibly to rectify the parameterization of the individual sensor-actuators 1 if necessary.

Interfacing: the master processor 17 is capable of communicating with a more advanced device (computer, electronic tablet). That makes it possible to have high-level tools to help the user in the phase of describing of the structure to be actuated, of the mapping of the arrangement of the sensor-actuators, of the parameterization of the internal model, namely a set of equations which, for example, describe the vibration modes (modal deformations). The parameters of these equations can be entered by the serial link. The real setpoints are transmitted by this means (the master processor 17 being then charged with projection in the modal base), that is to say that, based on a reference deformation that is desired, scalar product algorithms are used to calculate the amplitudes for each vibratory mode. The master processor 17 can upload the data collected from the slave processors 5 to allow them to be post-processed by the user.

ADVANTAGES OF THE INVENTION

The invention provides a response to the aims set and makes it possible to solve the problems identified with the actuators according to the state of the art.

In particular, the structure of each individual sensor-actuator 1 combined with control by a master processor 17 makes it possible to simplify the connector technology and to share the electrical power supply of the actuators (often high voltage) and the communication network, while avoiding inter-cable crosstalks. The synchronization of the sensor-actuator units 1 is ensured by the communication link and by the stability of the oscillators of the local processors 5.

The sensor-actuator units 1 can be used networked over several structures, the master processor 17 supplying voltage references suited to the application, which allows for great versatility of use.

The closed-loop control makes it possible to adapt to the parametric variations due to the changes of environmental conditions, so that the operation of the device is robust.

It is known that the problem of control of the vibration that is not colocated with the sensor is that the relative phase between the actuation and the signal measured by the sensor changes according to mode. Thus, actuator and sensor can be in phase for one mode and in phase opposition for an adjacent mode. Consequently, in closed-loop mode, the loop that is stable for one mode can be potentially destabilized by the adjacent mode because of the change of sign in the feedback.

The colocation of the sensor and of the actuator as described above makes it possible to eliminate this effect.

Moreover, the fact for a sensor-actuator of having a logical link which goes back to the master processor makes it possible for all the sensor-actuators to be synchronized. Furthermore, the master processor needs only a low-frequency communication with the slave processors which, for their part, work locally at a higher frequency, which avoids having to overdimension the master processor.

The invention claimed is:

1. A system having a plurality of sensor-actuator units fixed onto a first face of a plate to be actuated according to at least one predetermined vibratory mode including one or more of a single vibratory mode in which all the sensor-actuators are driven at the same frequency, or a multiple vibratory mode in which the sensor-actuators are driven at different frequencies, each sensor-actuator unit comprising:
an electromechanical actuator; and
a deformation or vibratory speed sensor, wherein
the actuator and the sensor of each sensor-actuator unit are distinct from each other and are both fixed onto said first face of the plate so as to create, on a second face of the plate opposite said first face, a vibration generating a haptic effect that can be felt by a finger or a stylus of a user, and
the actuator and the sensor of each sensor-actuator unit are fixed side-by-side on said first face of the plate, such that the actuator and the sensor of each sensor-actuator can respectively actuate and measure one and the same predetermined vibratory mode of the plate.

2. The system as claimed in claim 1, wherein the at least one predetermined vibratory mode includes the multiple vibratory mode, and wherein the distance between the sensor and the actuator of each sensor-actuator unit on said first face is less than or equal to half the vibration wavelength at the lowest resonance frequency, out of the actuation frequencies of the actuators of the system.

3. The system as claimed in claim 1, wherein the at least one predetermined vibratory mode includes the single vibratory mode, and wherein the distance between the sensor and the actuator of each sensor-actuator unit on said first face is equal to a multiple of half the vibration wavelength corresponding to the single actuation frequency of the actuators.

4. The system as claimed in claim 1, where the electromechanical actuator is a piezoelectric actuator.

5. The system as claimed in claim 1, wherein the maximum size of the actuator of each sensor-actuator unit is between 2 and 25 mm, so as to ensure the actuation of measurement functions while being small enough to be able to excite the vibratory modes of the smallest wavelengths in an ultrasonic vibratory frequency range lying between 20 kHz et 200 kHz.

6. The system as claimed in claim 1, wherein the sensor of each sensor-actuator unit is arranged to supply a measurement signal w(t) to a processor connected to the sensor-actuator unit, and in that said processor is arranged to calculate the value denoted $V_{in}(t)$ of the power supply voltage to be delivered to the actuator.

7. The system as claimed in claim 6, further comprising a DC-to-AC voltage converter controlled by said processor connected to the sensor-actuator.

8. The system as claimed in claim 7, wherein the value of the power supply voltage $V_{in}(t)$ is servocontrolled by said processor on the instantaneous value of the measurement signal w(t) delivered by the sensor.

9. The system as claimed in claim 1, further comprising a master processor connected in parallel to an input of each of slave processors of the sensor-actuator unit, so as to be able to dissociate the control signals of the different actuators.

10. The system as claimed in claim 9, wherein the master processor is configured to send each slave processor synchronization information at a frequency lower than the vibration frequency of the sensors.

11. The system as claimed in claim 9, wherein the master processor is configured to execute, during an initialization phase, a self-addressing algorithm so as to automatically establish the mapping of the network of sensor-actuators on the plate to be actuated.

12. The system as claimed in claim 9, wherein the master processor is configured to transmit to the slave processors the working parameters, namely the data necessary to the control of one or more vibratory modes.

13. The system as claimed in claim 9, wherein the master processor is configured to transmit to the slave processors voltage setpoint values for each vibratory mode, as a function of the spatial distribution of the sensor-actuators, of the resonance frequencies assigned to the different sensor-actuators during an initialization phase, and as a function of the effect sought on the surface of the plate to be actuated.

14. The system as claimed in claim 9, wherein the master processor is configured to, during a diagnostic phase, interrogate the slave processors to obtain their operating parameters and to rectify the parameterization of the individual sensor-actuators if necessary.

15. The system as claimed in claim 9, wherein the master processor is configured to, during an interfacing phase, communicate to an external processing device the data collected from the slave processors in order to allow the post-processing thereof.

* * * * *